United States Patent
Song et al.

(10) Patent No.: US 10,740,394 B2
(45) Date of Patent: Aug. 11, 2020

(54) MACHINE-IN-THE-LOOP, IMAGE-TO-VIDEO COMPUTER VISION BOOTSTRAPPING

(71) Applicant: OATH INC., New York, NY (US)

(72) Inventors: Yale Song, New York, NY (US); Guy Dassa, New York, NY (US); Minho Lee, New York, NY (US); Jeffrey Scholz, New York, NY (US); Joao Vitor Baldini Soares, New York, NY (US)

(73) Assignee: OATH INC., New York, NY (US)

( * ) Notice: Subject to any disclaimer, the term of this patent is extended or adjusted under 35 U.S.C. 154(b) by 228 days.

(21) Appl. No.: 15/941,437

(22) Filed: Mar. 30, 2018

(65) Prior Publication Data

US 2019/0220525 A1 Jul. 18, 2019

Related U.S. Application Data

(60) Provisional application No. 62/619,045, filed on Jan. 18, 2018.

(51) Int. Cl.
| | |
|---|---|
| *G06F 16/00* | (2019.01) |
| *G06F 16/783* | (2019.01) |
| *G06K 9/62* | (2006.01) |
| *G06K 9/00* | (2006.01) |
| *G06N 20/00* | (2019.01) |
| *G06F 16/738* | (2019.01) |

(52) U.S. Cl.
CPC ........ *G06F 16/7837* (2019.01); *G06F 16/738* (2019.01); *G06K 9/00718* (2013.01); *G06K 9/6256* (2013.01); *G06K 9/6262* (2013.01); *G06N 20/00* (2019.01); *G06K 2209/27* (2013.01)

(58) Field of Classification Search
CPC .................................................. G06F 16/7837
See application file for complete search history.

(56) References Cited

U.S. PATENT DOCUMENTS

2018/0020243 A1* 1/2018 Ni ..................... H04N 21/2187

OTHER PUBLICATIONS

Extended European Search Report to corresponding EP Application No. 19152571.6 dated Jun. 17, 2019 (10 pages).

(Continued)

*Primary Examiner* — Thu Nguyet T Le
(74) *Attorney, Agent, or Firm* — James J. DeCarlo; Greenberg Traurig, LLP

(57) ABSTRACT

Disclosed are systems and methods for improving interactions with and between computers in content searching, hosting and/or providing systems supported by or configured with devices, servers and/or platforms. The disclosed systems and methods provide a novel machine-in-the-loop, image-to-video bootstrapping framework that harnesses a training set built upon an image dataset and a video dataset in order to efficiently produce an accurate training set to be applied to frames of videos. The disclosed systems and methods reduce the amount of time required to build the training dataset, and also provide mechanisms to apply the training dataset to any type of content and for any type of recognition task.

20 Claims, 9 Drawing Sheets

(56) References Cited

OTHER PUBLICATIONS

Gan et al., "You Lead, We Exceed: Labor-Free Video Concept Learning by Jointly Exploiting Web Videos and Images," 2016 IEEE Conference on Computer Vision and Pattern Recognition (CVPR), IEEE, pp. 923-932 (2016).

Gan et al., "Webly-supervised video recognition by mutually voting for relevant web images and web video frames," Serious Games, vol. 9907 (2016).

Kumar et al., "Track and Transfer: Watching Videos to Simulate Strong Human Supervision for Weakly-Supervised Object Detection," 2016 IEEE Conference on Computer Vision and Pattern Recognition (CVPR), IEEE, pp. 3548-3556 (2016).

Su et al., "Transfer Learning for Video Recognition with Scarce Training Data for Deep Convolutional Neural Network," pp. 1-12 (2015).

Hong et al., "Weakly Supervised Semantic Segmentation using Web-Crawled Videos," Arxiv. Org, Cornell University Library (2017).

* cited by examiner

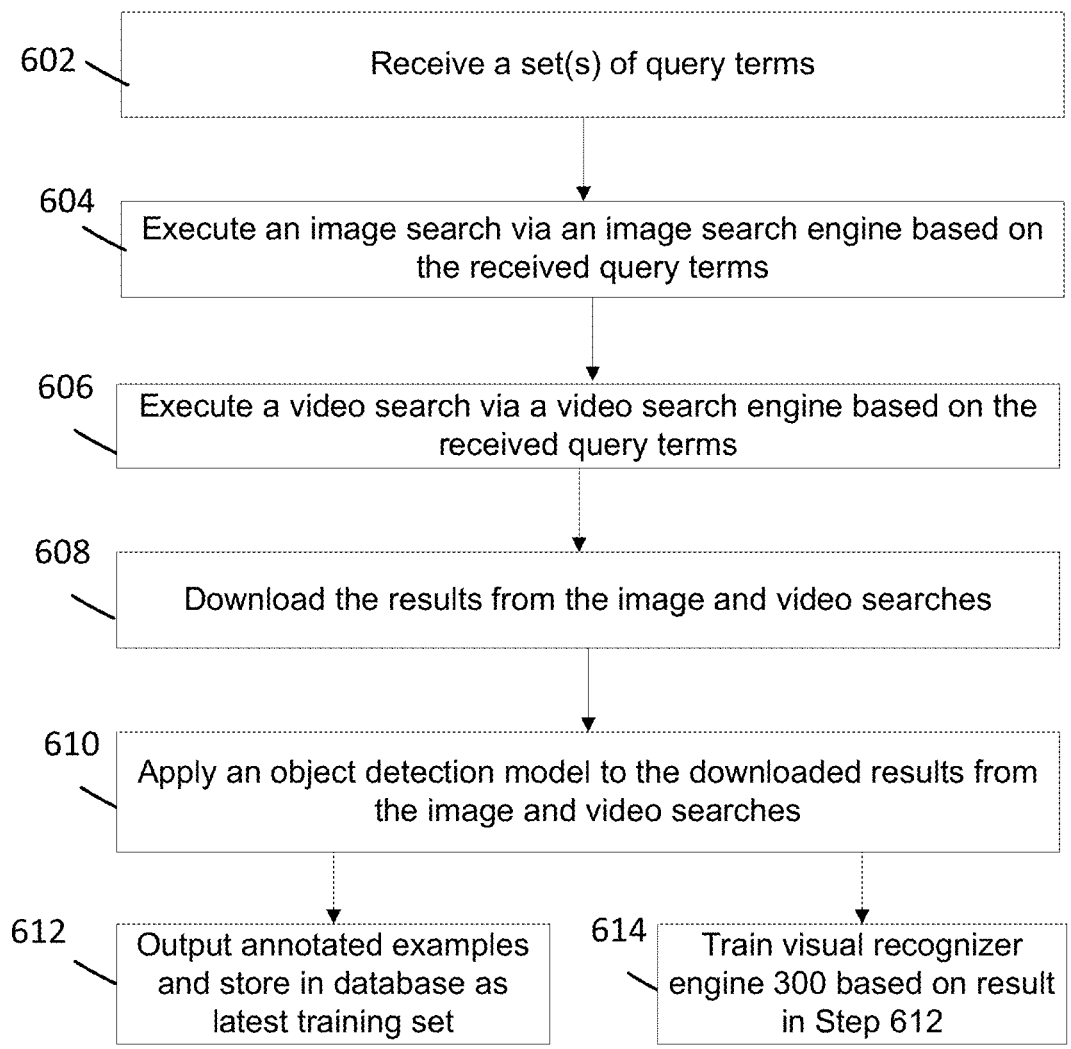

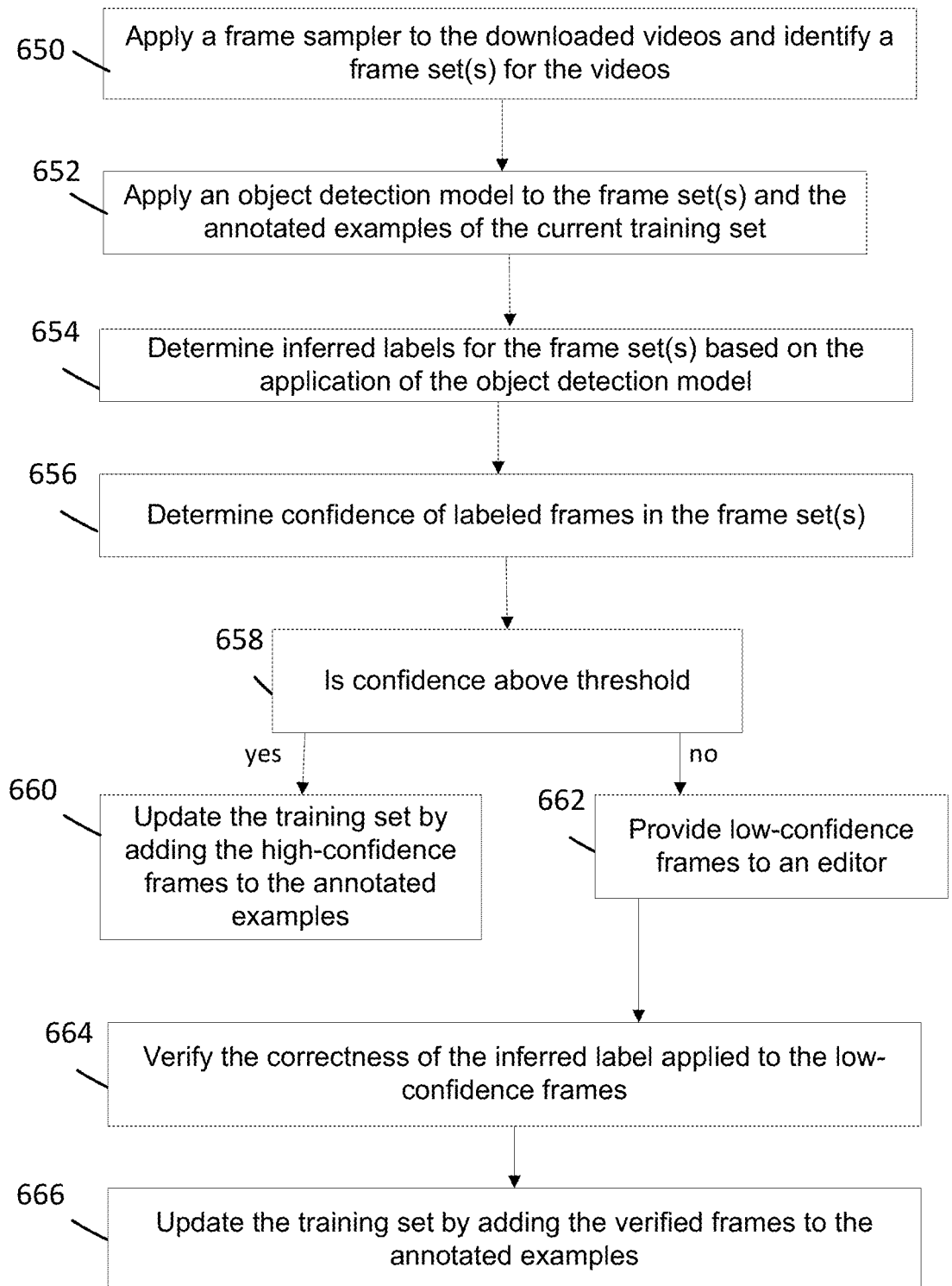

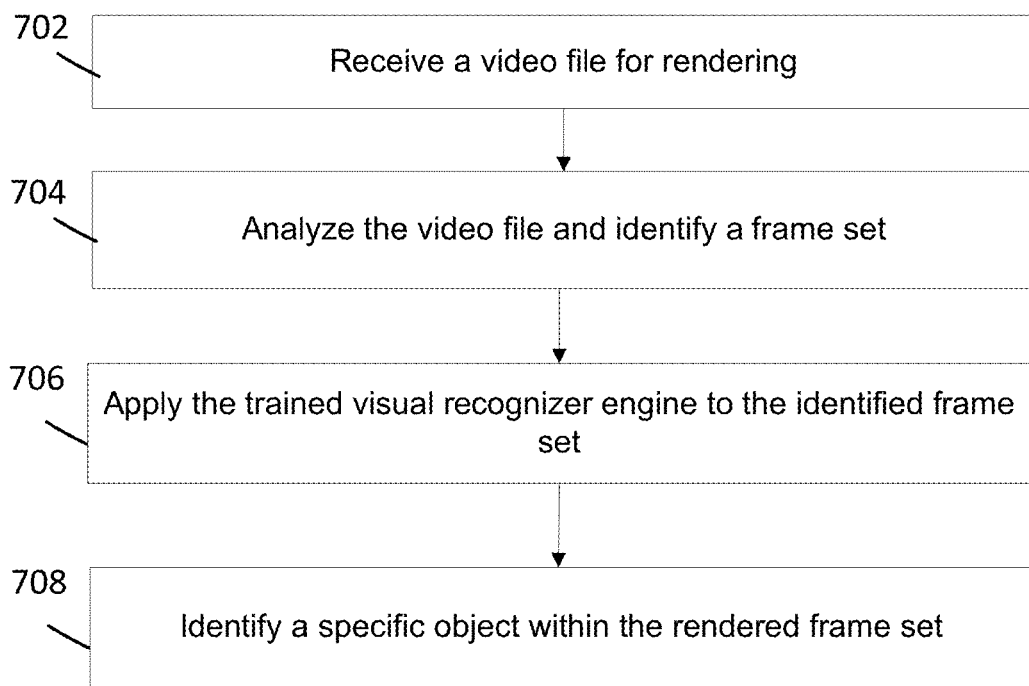
FIG. 7    700

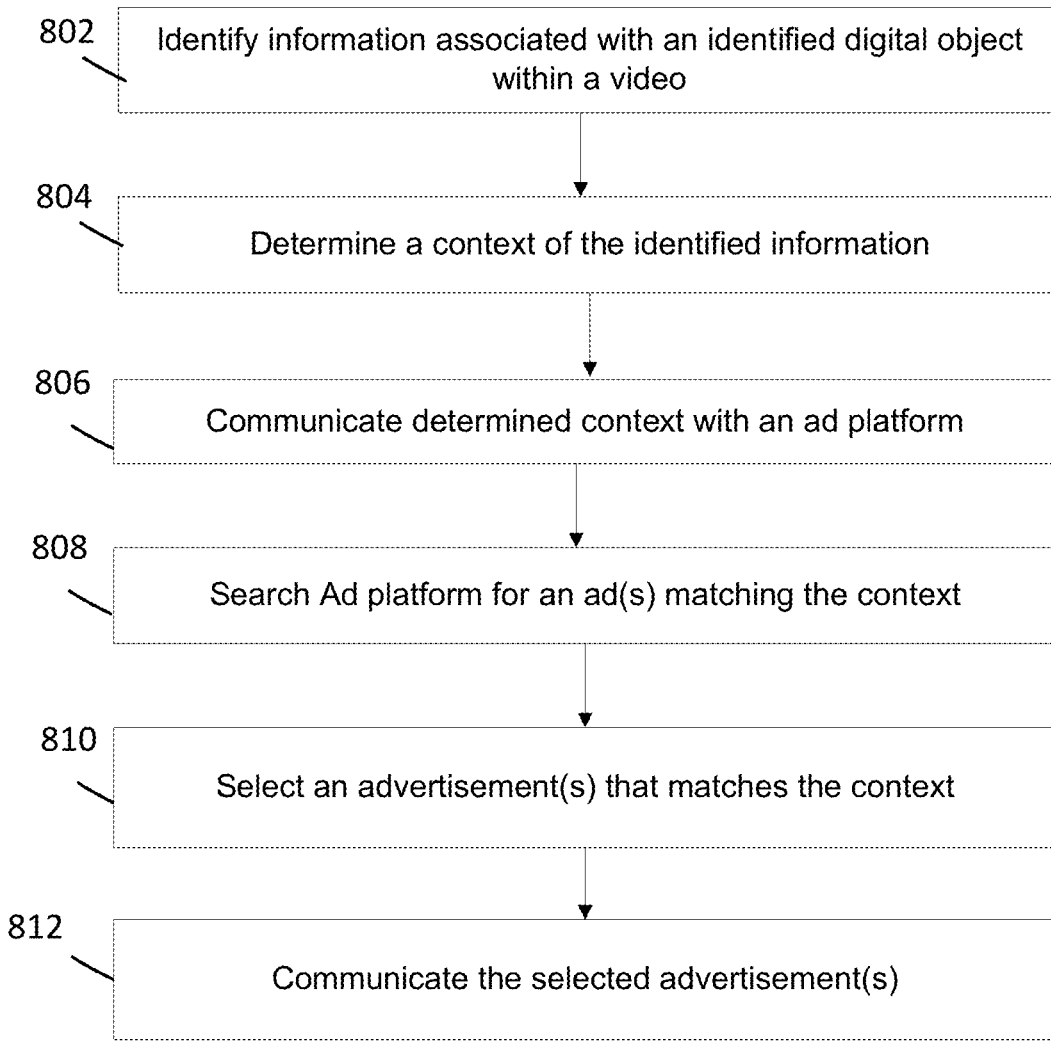

MACHINE-IN-THE-LOOP, IMAGE-TO-VIDEO COMPUTER VISION BOOTSTRAPPING

CROSS-REFERENCE TO RELATED APPLICATION

This instant application claims the benefit of priority from U.S. Provisional Application No. 62/619,045, filed on Jan. 18, 2018, which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content hosting and providing devices, systems and/or platforms by modifying the capabilities and providing non-native functionality to such devices, systems and/or platforms through a novel and improved framework for training and applying a computer vision bootstrapping model to video.

BACKGROUND

Modern computer vision systems can be applied to digital content for purposes of performing visual recognition tasks including, for example, face recognition, medical imaging, scene understanding for self-driving, and the like. The major bottleneck in applying such systems is the need for large-scale annotated datasets. Such systems must be trained with millions of annotated examples in order to function properly for a given task. Training and deploying computer vision into products today requires a significant amount of effort into annotating datasets (e.g., both by human and machine alike), thereby reducing the speed in which such systems are trained and ready for implementation, and drastically delaying the time-to-market.

In today's world, video understanding is one of the most important areas of research and development across the media industry. Unfortunately, compared to image datasets, video datasets are notoriously difficult to annotate due to the sheer number of frames that need to be inspected by labelers. For example, the task of drawing bounding boxes around certain objects for every single frame of a video requires significant amounts of time and effort, high utilization of computer and network resources, and is not necessarily always accurate.

This, therefore, has motivated several prior works to use a workaround solution where a visual recognizer is trained on an image dataset and then applied to the video domain. However, this does not perform well in practice since video frames do not manifest the same visual characteristics as images. This is because of the way they are captured and encoded. Videos capture dynamic moving objects while images capture static objects, and the location of the objects within/across video frames can change while the location within an image remains the same. Additionally, most video codecs apply compression algorithms to make the file smaller, which can result in blurry frames, and image files are typically not subject to compression. Therefore, in order to apply such conventional techniques, visual recognizers trained on image datasets must be readjusted for each video frame, which further limits the speed and accuracy upon which the systems can be built and applied.

SUMMARY

The disclosed systems and methods provide a technical solution to existing technical problems, especially those highlighted above, by providing an improved processing framework that reduces the time and computational resources required to annotate large-scale video datasets and train a visual recognition system therefrom. Through the advanced training and applications disclosed herein, systems implementing such a visual recognition framework can realize improved accuracy in the way video content is detected, reduced reliance on human editors during such training, and a reduction in the usage of computational resources during training and subsequent detection/recognition when applying the trained system. That is, for example, the efficiency in the way the system is trained can effectuate a reduction in the amount of search iterations and CPU cycles required when applying the trained system to identify which objects are being recognized within the frames of a video—i.e., a more accurately and efficiently trained system produces more accurate and efficient results, thereby improving the efficiency of the computational and network resources required to produce a satisfactory result.

According to embodiments of the instant disclosure, the disclosed framework is embodied as a novel machine-in-loop, image-to-video bootstrapping technique. The basis of the technique/framework is that it is relatively easy to obtain image datasets compared to videos: one can easily obtain hundreds of images that contain a certain concept (e.g., cats) by using image search engines. The disclosed systems and methods bootstrap data from those images (with potentially noisy labels) and go through multiple annotation steps to "transform" it into a video dataset, thereby producing the disclosed image-to-video bootstrapping technique. The key in this iterative process is the machine-in-the-loop aspect of the disclosed system. In each iteration, the disclosed framework trains a visual recognition model on annotated examples produced from "up to that iteration" results, and then detects and recognizes relevant visual concepts from an unlabeled video dataset.

In some embodiments, after each iteration, labelers can be presented with a few examples of when/how the visual recognizer has produced inaccurate results, whereby the labelers can provide the required correction. Providing labels (e.g., tags) to those examples improves the accuracy of the visual recognizer in the next iteration, thereby improving the quality of labels overall. As with any training model, the visual recognizer can be expected to make mistakes in early iterations, but as the quantity of iterations increases, the more accurate the recognizer becomes, and hence the quality and speed of labeling improves.

As a byproduct of the disclosed system, the disclosed visual recognition framework/model has a key technical advantage over existing recognition models through its iterative design and bootstrapping. The disclosed framework and its application thereof, as discussed in more detail below, provides advanced mechanisms that reduce the processing power required to perform video recognition training and processing, thereby enabling even the most modestly configured devices with the capability to perform the disclosed recognition processing. Further, the need for annotations, and human involvement and intervention is significantly reduced, which leads to increased processing speeds and improved efficiency in how the disclosed system processes videos for purposes of identifying the object/elements depicted therein.

This iterative training process and automatic application to rendered video, as discussed in detail below, leads to an easier-to-use/implement and more efficient comparative training set that significantly reduces the time required to train a classifier (referred to as a visual recognizer). Thus, having the more accurately and efficiently trained model, the implementation of such trained model leads to an efficient result, as the classifications of detected objects is based upon a more accurate training set, which reduces the number of computational cycles required for performing the classification (e.g., an accurate training set leads to an efficient result when applying the training set).

In accordance with one or more embodiments, the instant disclosure provides computerized methods for executing the video training and processing framework discussed herein, as well as a non-transitory computer-readable storage medium for carrying out the above mentioned technical steps of the video training and processing framework. The non-transitory computer-readable storage medium has tangibly stored thereon, or tangibly encoded thereon, computer readable instructions that when executed by a device (e.g., content server, client device, and the like) cause at least one processor to perform a method for a novel and improved framework for training and applying a computer vision model to video.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 6A-6B are flowcharts illustrating steps performed for training the visual recognizer engine in accordance with some embodiments of the present disclosure;

FIG. 7 is a flowchart illustrating steps performed for applying a trained visual recognizer engine in accordance with some embodiments of the present disclosure; and FIG. 8 is a flowchart illustrating steps performed in accordance with some embodiments of the present disclosure.

DESCRIPTION OF EMBODIMENTS

Figure 1:
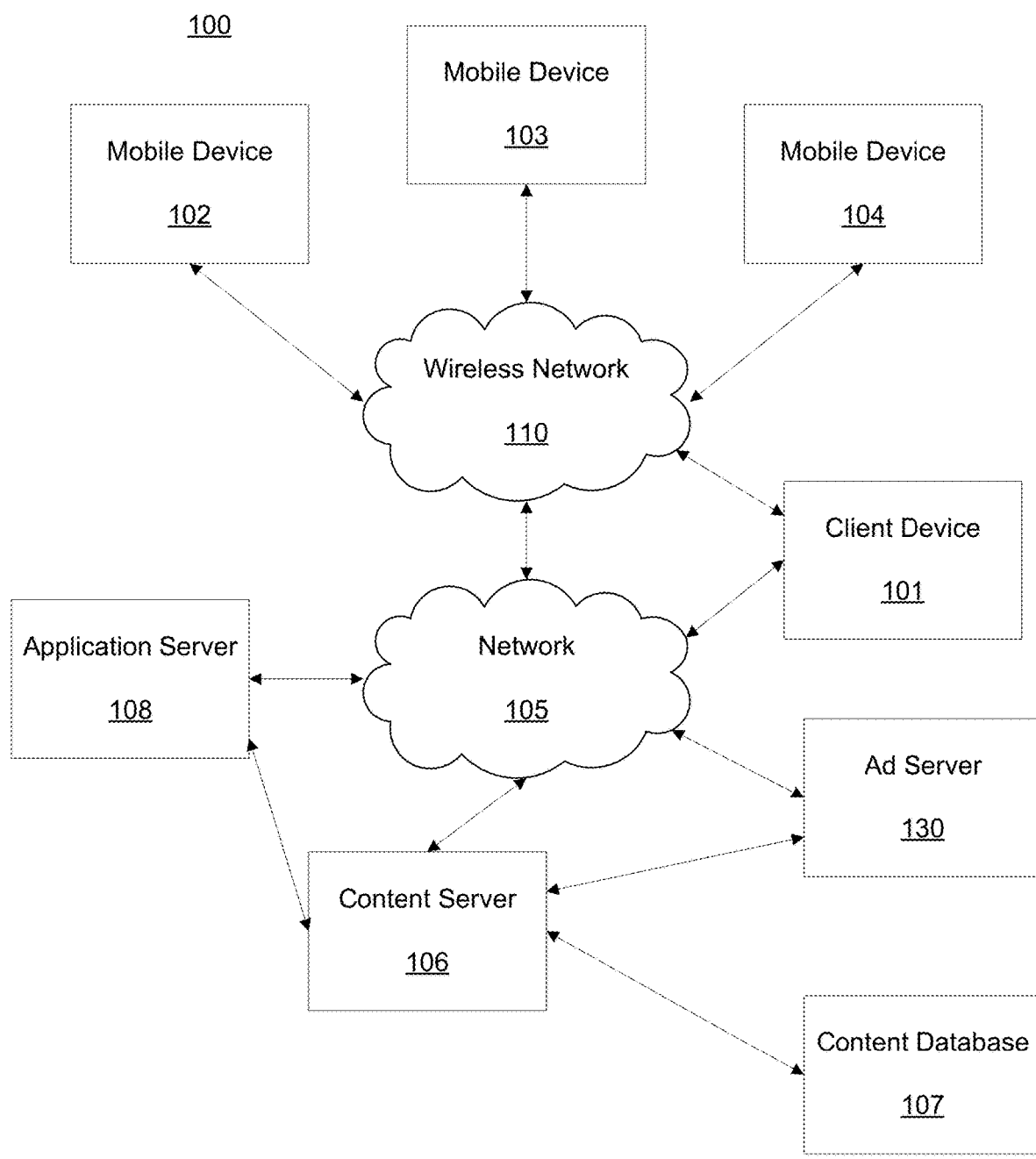
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet can be a client device. In another example, a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as live broadcasts of professional sporting events). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide advanced mechanisms for training and applying a visual recognition model in order to more accurately and efficiently detect, recognize or otherwise identify specific objects within video frames of a video file.

As discussed above, conventional recognition techniques implement image processing mechanisms on videos in order to identify specific objects. However, such techniques are not only inefficient, they produce inaccurate results. That is, as discussed above, since video frames do not manifest the same visual characteristics as images (e.g., they have dynamic objects rather than static objects, and are encoded), applying image recognition techniques to videos produces results that require a significant amount of "after-the-fact" processing in order to understand and/or correct these results. Besides the obvious drawbacks of inefficient and inaccurate results, such conventional applications require a large amount of data processing which results in a waste of device and network resources, as the systems must execute additional computational steps in order to ensure that the results are accurate.

The disclosed systems and methods provide a novel image-to-video bootstrapping framework that reduces the amount of time to produce the video training dataset, which thereby effectuates increased accuracy and efficiency in how the dataset is created, and ultimately applied. For example, conventional systems require around 3 weeks to train a system on the typically large amount of information in a dataset (e.g., millions of images); whereas the disclosed systems and methods can train a system in a much shorter period of time on the same amount of data (e.g., 3 days). As discussed herein, the disclosed systems and methods harness the results of image searching and video searching (e.g., the bootstrapping of images and videos) to provide an active learning system that increases its accuracy and efficiency through each learning iteration. Therefore, when analyzing frames of a video, the disclosed framework is executing a system that harnesses bootstrapped images and videos and outputs accurate results in a computationally efficient manner, thereby saving system resources for the high-quality output of the file rather than the analysis/identification of which objects are being displayed.

Applications of the improved processing framework discussed herein can analyze a video in any format that is either known or to be known (e.g., any type of file format and/or rendering format). For purposes of this disclosure, the discussion herein focuses on object recognition within video; however, this should not be construed as limiting, as any type of known or to be known format of media, whether images or other forms of multi-media, for example, can be utilized without departing from the scope of the instant disclosure.

As discussed in more detail below at least in relation to FIG. 8, according to some embodiments, information associated with, derived from, or otherwise identified from, during or as a result of recognition processing of a video file, as discussed herein, can be used for monetization purposes and targeted advertising when providing, delivering or enabling such devices access to content over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Thus, client device 101 may also have differing capabilities for displaying navigable views of information.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a video application (e.g., Netflix®, Hulu®, iTunes®, Amazon Prime®, HBO Go®, and the like), for example, can be hosted by the application server 108 (or content server 106 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
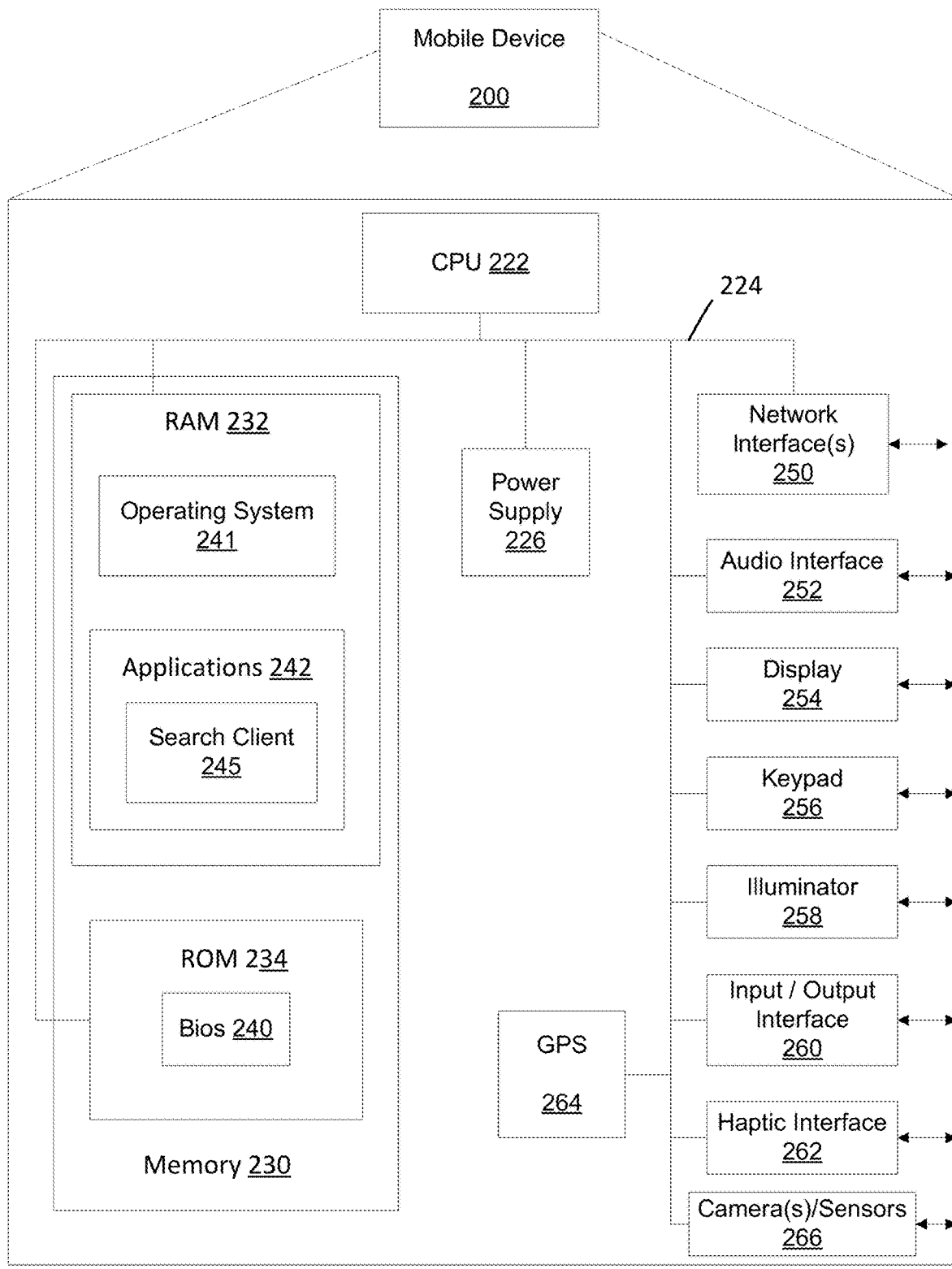
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-8.

Figure 3:
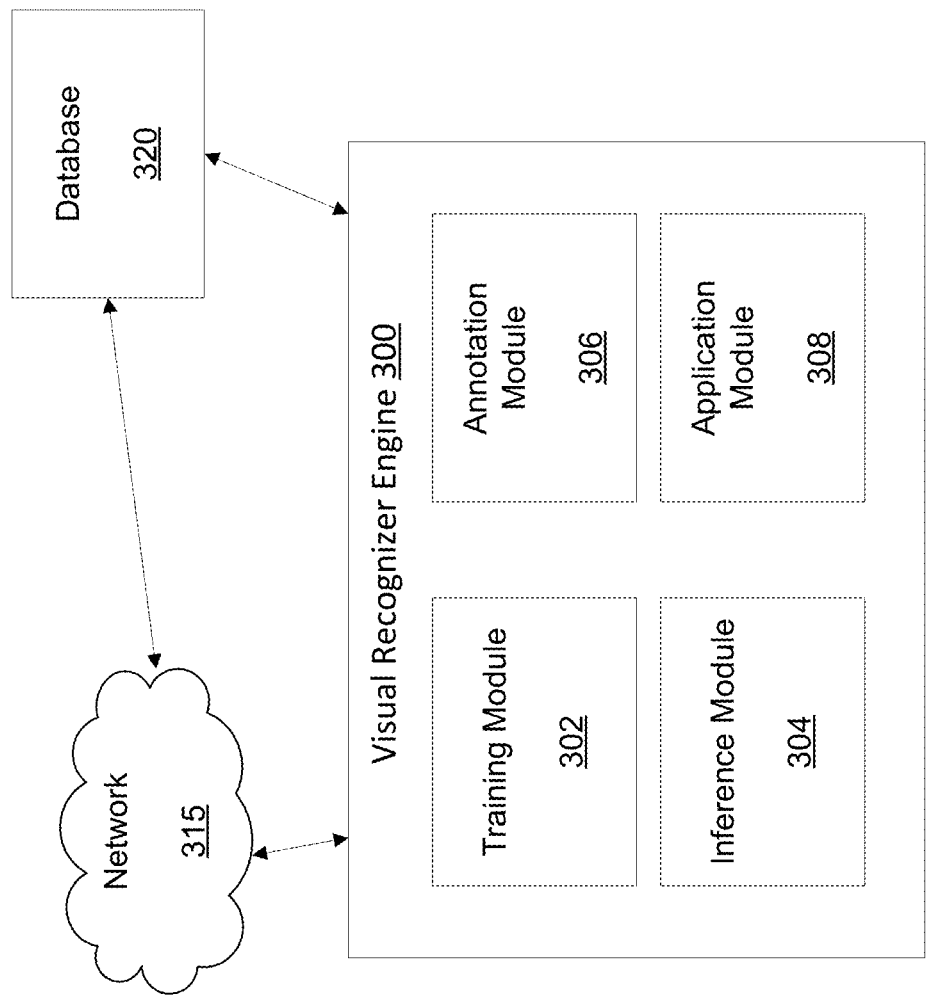
FIG. 3 is a block diagram illustrating components of an exemplary system in accordance with embodiments of the present disclosure.

FIG. 3 is a block diagram illustrating the components for performing the systems and methods discussed herein. FIG. 3 includes a visual recognizer engine 300, network 315 and database 320. The visual recognizer engine 300 can be a special purpose machine or processor and could be hosted by an application server, content server, social networking server, web server, search server, content provider, third party server, user's computing device, and the like, or any combination thereof.

According to some embodiments, visual recognizer engine 300 can be embodied as a stand-alone application that executes on a user device. In some embodiments, the visual recognizer engine 300 can function as an application installed on the user's device, and in some embodiments, such application can be a web-based application accessed by the user device over a network. In some embodiments, the visual recognizer engine 300 can be installed as an augmenting script, program or application (e.g., a plug-in or extension) to another media content hosting/serving application (e.g., Yahoo! Sports®, Yahoo! Video®, NFL® Video, NHL® Video, MLB® Video, Hulu®, YouTube®, Verizon® Video, and the like).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes of creating, streaming, recommending, rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with video content from an assortment of media and/or service providers and/or platforms. For example, the information can be related to, but not limited to, content type of the video, a category associated with the video, information associated with the pixels and frames of the videos, information associated with the provider of the video, information associated with the players involved in the video, information associated with the activity being depicted in the video, and any other type of known or to be known attribute or feature associated with a video file, or some combination thereof. Additionally, the video information in database 320 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Verizon®), by the content/service providers providing video content (e.g., Verizon®, ESPN®, ABC Sports®, Netflix®, Hulu®, YouTube®), or by other third party services (e.g., rottentomatoes.com, IMDB™, Facebook®, Twitter® and the like), or some combination thereof.

According to some embodiments, as such video information is received or analyzed, it can be stored in database 320 as a n-dimensional vector (or feature vector) representation for each video and/or for frames of the video, where the information associated with the video can be translated as a node on the n-dimensional vector. In some embodiments, as digital objects within a video are identified, detected and/or tracked, information corresponding thereto can also be stored in the database 320 in a similar manner. Database 320 can store and index video information in database 320 as linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion above involves vector analysis of video and video information associated therewith, the stored video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., streaming, downloadable or on-demand videos), other forms of user generated content and associated information, including for example text, audio, multimedia, RSS feed information can be used without departing from the scope of the instant application, which can thereby be communicated and/or accessed and processed by the visual recognizer engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the visual recognizer engine 300, and the database of stored resources 320. Indeed, as illustrated in FIG. 3, the visual recognizer engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as visual recognizer engine 300, and includes training module 302, inference module 304, annotation module 306 and application module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
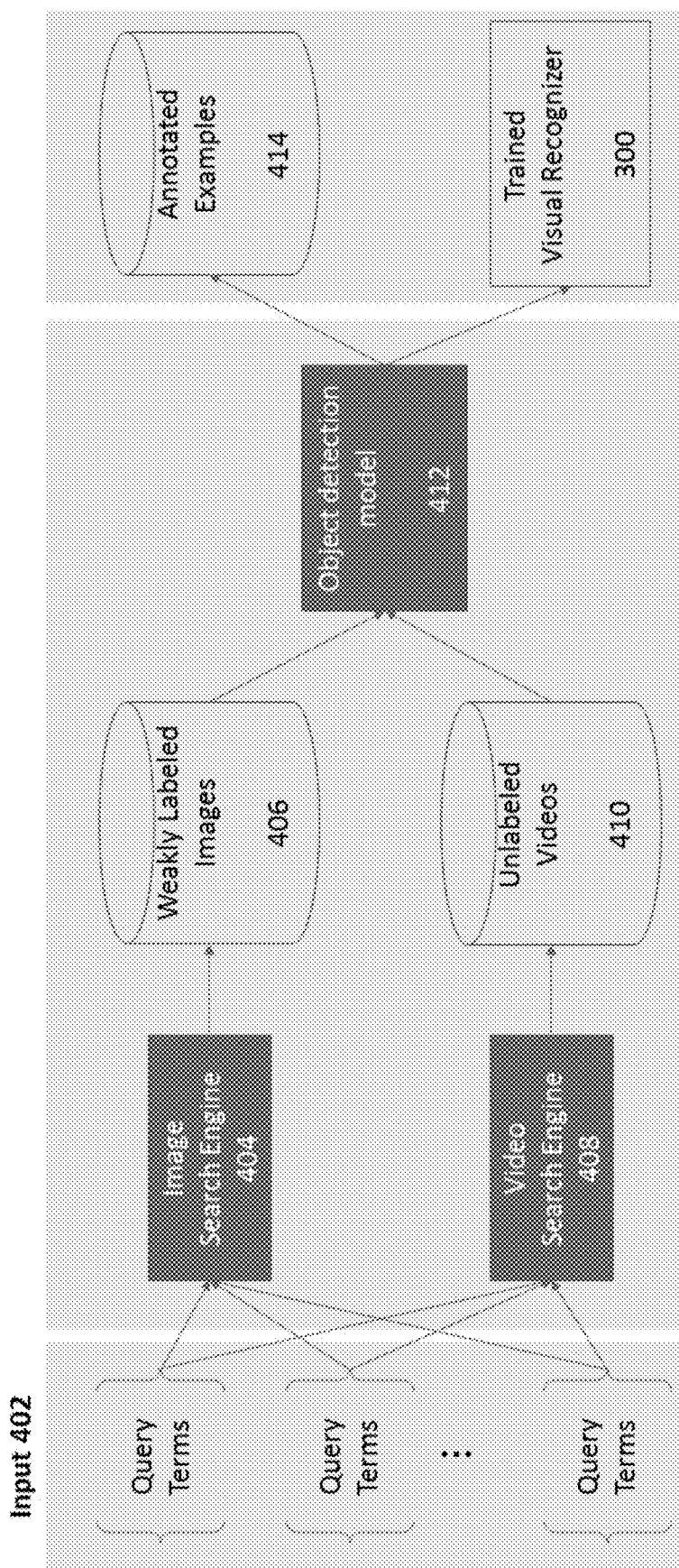
FIG. 4 is a block diagram illustrating an exemplary data flow of training the machine-in-the-loop, image-to-bootstrapping ("visual recognizer") engine according to some embodiments of the instant disclosure.

Turning to FIG. 4, an overall data flow 400 of the image-to-video bootstrapping training framework is illustrated. The data flow 400 provides a depiction of how the visual recognizer engine 300 is trained in the novel manner based on the bootstrapping of images and videos. As discussed above, this novel technique harnesses the data provided from both image and video datasets, rather than simply image datasets as in conventional systems. As will be clear from the discussion below related to both FIG. 4 and FIG. 5, as well as those in FIGS. 6-7, the initial iterations of the training of engine 300 begins with the usage of image datasets, then transitions to both image and video datasets, and eventually solely utilizes video dataset information, which thereby provides the accuracy in object detection within videos that conventional systems are lacking.

The data flow 400 involves interactions between an image search engine 404, video search engine 408 and an object detection model 412. In some embodiments, the image search engine 404 and the video search engine 408 can be separate search engines, and in some embodiments, engine 404 and engine 408 can be the same engine performing separate searches for specific data types—i.e., image files and video files, respectively.

The data flow 400 begins with input 402. Input 402 includes n number of query terms. In some embodiments, each input 402 can be a set of terms where each term corresponds to a single object that is being requested to be detected. For example, if a user desires to build an object detection system for two (2) categories: dogs and cats, the user can provide two sets of query terms, each containing the names of different breeds of dogs and cats. For example, one set can include (dogs): Golden Retriever, Mutt, Hound, Pitbull; and the other set can include (cat): Devon Rex, Tabby, Sphinx, Short Hair.

After receiving theses inputs 402, the system performs an image search and a video search via engines 404 and 408, respectively. Upon searching and identifying a predetermined number of each of the breeds identified in each input query 402, the identified results are downloaded (and stored in database 320). The image results 406 identified by the image search engine 402 are assumed to be "weakly-labeled" in the sense that there is a high likelihood that an identified image contains the query term. This assumption is predicated upon the inherent search capability and functionality of the image search engine, as the search engine performs parsing of the data and metadata of a collection of images, and then the identification of specific images matching the search terms according to any known or to be known technique executed by any known or to be known search engine.

In a similar manner, the video results 410 identified by the video search engine 408 are also assumed to be related to the query terms. However, they are assumed to be "unlabeled." An "unlabeled" assumption of the video results is based on the fact that there is no frame-level annotation available on these video files. Thus, engine 408 analyzes, parses, determines or otherwise identifies video results from the data and metadata related to the video according to known or to be known video search functionality executed by known or to be known video search engines.

Upon downloading the image search results 406 from the image search engine 404 and the video search results 410 from the video search engine 410, these results are then run through an object detection model 412. The image-to-video bootstrapping processing steps performed by the execution of the objection detection model 412 is discussed in detail in relation to FIG. 5 below, and as a result of this processing, a set of annotated examples 414 is generated which is utilized to train the visual recognizer engine 300. As discussed below in relation to FIG. 5, the annotated examples 414 include a set of annotated videos that are annotated based on a comparison/classification of the unlabeled videos 410 and the weakly labeled images 406. Thus, as discussed in detail below in relation to FIG. 7, the trained visual recognizer engine 300 can render, stream, download or otherwise play a video, and during rendering of each frame set of the video, the engine 300 can perform object detection modelling utilizing the annotated examples 414 as a basis for determining and identifying which objects are depicted in and across frames in each frame set.

Figure 5:
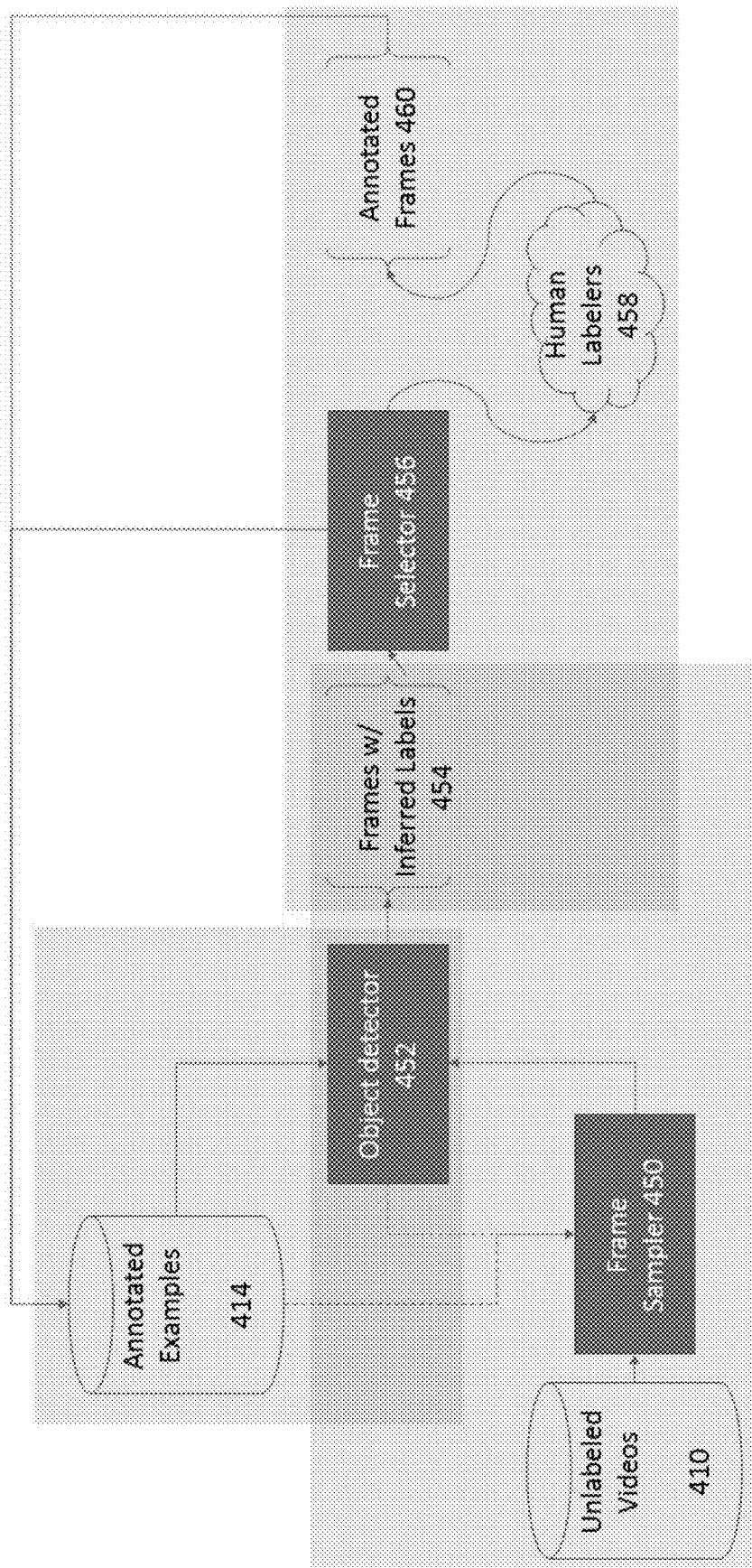
FIG. 5 is a block diagram illustrating a non-limiting example of the object model detection utilized for training the visual recognizer engine according to some embodiments of the instant disclosure.

Turning to FIG. 5, the image-to-video bootstrapping performing by the object detection model 412 is illustrated. FIG. 5 depicts a recursive loop of iterations that results in the iterative training of the visual recognizer engine 300. That is, modelling 412 in FIG. 5 depicts the bootstrapping of the data from images and videos, where the unlabeled videos are ultimately annotated and transformed into the annotated examples 414 that are utilized to train the engine 300. As discussed above, the key in this iterative process is the machine-in-the-loop aspect of the modelling 412. In each iteration, the objection detection model 412 trains a visual recognition engine 300 on annotated examples 414 produced from "up to that iteration" results; therefore, after each iteration, the accuracy and reliance on solely video data increases (e.g., the portion of image data making up the annotated examples 414 decreases while the portion of video data increases) thereby enabling the engine 300 to accurately perform object modelling on video frames.

The modelling 412 begins with a frame sampler 450 sampling the unlabeled videos 410. In some embodiments, the sampler 450 executes a neural network (e.g., convolution neural network (CNN)) algorithm, technique or mechanism in order to perform region proposal on each of the frames of the videos 410. In some embodiments, this involves applying a CNN model to each of the frames of each of the videos 410 which results in parsing and identifying (in some embodiments, extracting) the frame data of each videos' frames. As understood by those of skill in the art, such application results in the process referred to as "region proposal" where an input frame of a video (i.e., an image frame) is input into the sampler 450 and the output contains such frames having a bounding box applied to specifically detected elements that have a threshold level of visual saliency. Thus, using the example above, for the "cat" videos, bounding boxes are applied to the areas of the frames that have cats depicted therein. This, therefore, results in a sampling of the videos so that only the frames that have the desired object are presented to the object detector 452.

In some alternative embodiments, the sampler 450 utilizes frames that have already been labeled by human labelers 458 as a basis for sampling/filtering the video frames of videos 410. A video contains many redundant frames, and utilizing the data from human labeled frames that provide an indication as to which frames contain an object, the sampler can track that object across a sequence of frames that are "unlabeled." Thus, in some embodiments, the sampler 450 can begin by identifying a human labeled frame, then perform an object tracking technique in order to determine the frames surrounding the labeled frame that have similar content (i.e., that have the object depicted therein).

In some embodiments, the sampler 450 can execute the CNN region proposal technique and the human-labelling technique in concert by beginning with the frames that have known labels, then process the surrounding frames via the CNN region proposal technique discussed above.

After the sampler 450 samples the frames of the videos 410, the results are provided to the object detector 452, which also receives as an input the annotated examples 414. As discussed above, during the first iteration of the modelling 412, the annotated examples 414 contain solely the "weakly labeled" images 406 (and during the subsequent iterations, the examples 414 contain a more-and-more pronounced inverse ratio of image data to video data). Thus, for the first training iteration of the engine 300, the object detector receives the sampled frames of the videos 410 from the sampler 450 and the data related to the annotated examples 414 (which for the first iteration includes the weakly labeled images 406). The object detector then executes any known or to be known visual recognition model on these inputs, including, for example, the Deformable Parts Model, the Single Shot Detector (SSD), the You Only Look Once (YOLO) detector, and the like.

The result of such visual recognition modelling of the examples 414 and the sampled videos 410 performed by the object detector 452 are video frames that have inferred labels 454. For example, using the example above involving "cats" and "dogs," the unlabeled videos 410 now have specific frames labeled (or tagged) with indicators indicating where within such frames a cat or dog are detected. Such labeling can involve information as follows: {(video id, frame id, x-coordinate, y-coordinate, width, height, category_label)}. The "video id" indicates which video from the videos 410 the frame was sampled from; the "x-coordinate" and "y-coordinate" values indicate the x-y coordinates within the frame where the cat/dog are depicted; the "width" and "height" values indicate the size coordinates of the bounding box applied to the detected cat/dog; and the "category_label" indicates whether a cat or dog was detected.

The modelling 412 then takes the frames with inferred labels 454 that were output from object detector 452 and applies a frame selector 456 to determine whether the frames 454 should be added to the annotated examples or whether a human labeler review is required. This determination is based on a confidence determination performed for each inferred labeled frame 454. In some embodiments, this involves analyzing the frames by applying an artificial network classifier and determining a confidence value that indicates how accurately the inferred label was applied. For example, if a cat is depicted in a frame, and the frame is labeled accordingly, and the depiction of the cat is unhindered by another object in the scene, the confidence value can be determined to be high; however, should the cat's ears and head be hidden, then this could lead to a low confidence value as the body of a cat and a dog could be similar and lead to an inaccurate classification of the object. Should the confidence value determined by the classifier for a given frame 454 be at or above a threshold value set by a system operator or administrator or user as an application specific variable (e.g., 90%), then the frame 454 is added to the annotated examples 414. Should the confidence value be below the threshold value, but above a minimal threshold value set by a system operator or administrator or user as an application specific variable (e.g., 10%), then that frame 454 is provided to a human labeler 458 for review and/or correction. Upon review and/or correction by the labeler 458, which can involve reviewing the frame and confirming, correcting or removing the label from the frame, it is annotated as such and added to the annotated examples 414. If the inferred label of the frame 454 is below the minimal threshold, then it can be discarded.

The modelling process of 400 and sub-process 412 of FIGS. 4-5 are performed iteratively and result in an accurate, efficiently trained visual recognizer engine 300 that can readily identify specific objects within videos as the videos are rendered/played. As discussed above, the modelling 400/412 is performed by starting the training with images and slowly moving to video frames as the basis for such training. As described above, images searched by web search engines tend to be more accurate (e.g., it can be expected to see cat images when searched with the term "cat"), but this is not necessarily true for videos. Even though videos are identified based on the query terms, there is no information indicating which frames of the video actually contain the query term. The framework discussed above harnesses image search results at the beginning of the process in order to guide how video frames are analyzed, thus resulting in the image-to-video bootstrapping. This domain-to-domain bootstrapping combines concepts of active learning and cross domain bootstrapping that enables frames of videos to be actively analyzed as they are rendered and accurately processed for purposes of identifying what the frames are actually depicting across a sequence of such frames.

Turning to FIGS. 6A-7, the processes discussed herein detail steps performed in accordance with some embodiments of the present disclosure for building and implementing the machine-in-the-loop, image-to-video bootstrapping technique, as discussed above in relation to FIGS. 4-5. The processes of FIGS. 6A-6B detail the steps of building and training the framework (as depicted in FIGS. 4 and 5, respectively), and Process 700 of FIG. 7 details the steps of applying such framework to a video (i.e., as the video is rendered on a computing device (e.g., a user's mobile device)).

Turning to Process 600 of FIG. 6A, which further discusses the steps discussed above in relation to data flow 400 of FIG. 4, the visual recognizer engine 300 is trained to be provided with functionality for identifying specific elements within each frame of a video file. According to embodiments of the instant disclosure, Steps 602-610 of Process 600 are performed by the training module 302 of the visual recognizer engine 300, Step 612 is performed by the inference module 304 and Step 614 is performed by the annotation module 306.

Process 600 begins with Step 602 where a set of query terms is received. As discussed above in relation to FIG. 4, this can involve receiving a number of terms for a type of object desired to be detected (for purposes of training the engine 300). In Steps 604 and 606, an image search engine and a video search engine execute a search for the terms from Step 602. In Step 608, the results identified from Steps 604 and 606 are downloaded and stored. In Step 610, an object detection model is applied to the downloaded results. As discussed above in relation to FIGS. 4 and 5, the application of the object detection model results in video frames being labeled and added to the annotated examples 414. The annotated examples 414 are utilized to train the visual recognizer engine 300 so that when a video is played, the individual frames of that video can be accurately processed in order to detect specific objects depicted therein (as discussed in relation to FIG. 7 below).

Turning to FIG. 6B, the process of performing Step 610 within Process 600, where the object detection model is applied (item 412 from FIGS. 4-5), is detailed. Step 610 involves the image-to-video bootstrapping discussed herein. The modelling in in Step 610 begins with sub-step 650 where a frame sampler is applied to the downloaded videos, which are then sampled and a set of frames having a detected object depicted therein is identified, as discussed above in relation to FIG. 5. In sub-step 652, an object detection model is applied to the sampled video frames and the annotated examples, as discussed in relation to FIG. 5. In sub-step 654, inferred labels are determined and applied to the sample video frames based on the application of the object detection model. As discussed above in relation to the applied object detector 452 in FIG. 5, the annotated examples are compared against the sampled video frames by the object detector 452 and the result is the inferred labeled video frames 454.

In sub-steps 656, the frame selector 456 analyzes the applied inferred labels from Step 654 and a confidence value is determined. A determination is then made in sub-step 658 regarding whether the applied label satisfies a confidence threshold, and if so, the training set is updated by adding those video frames to the annotated examples 414. Sub-step 660, and discussed above in relation to FIG. 5. If the confidence is below the threshold, then those video frames are provided to an editor (e.g., a human labeler 458)—Step 662. In Step 664, the editor verifies the correctness of the inferred labels by correcting or approving the label, as discussed above in relation to FIG. 5. These verified frames are then added to the annotated examples in Step 666. Again, as discussed above, the updated training set (i.e., the annotated examples 414 that have added therein the high-confidence frames and the verified, low-confidence frames) is utilized to train the engine 300 which can be applied to a rendered video, as discussed below in relation to FIG. 7.

According to some embodiments, process 600 of FIG. 6A and sub-process 610 of FIG. 6B can be recursively performed until a threshold level of video data makes up the entirety of the annotated examples 414. This would involve completing Process 600, then beginning again by searching for videos via the video search engine. However, as discussed above, instead of utilizing results from an image search, the object detection model 412 compares the video results to the updated training set (i.e., the updated annotated examples from the previous iteration). Thus, after each iteration, the visual recognizer engine 300 will eventually be trained by entirely video data thereby improving the accuracy and efficiency in which object can be detected across a sequence of video frames.

Turning to FIG. 7, Process 700 details the steps of applying the trained visual recognizer engine 300 to a video file being rendered. According to some embodiments, Steps 452-454 of Process 450 are performed by the application module 308 of the visual recognizer engine 300.

Process 700 begins with Step 702 where a video file is received for display within a user interface (UI). According to some embodiments, the video file can be live-stream of an HTTP Live Streaming (HLS) file, and in some embodiments, the video can be any type of downloadable or renderable media file, as discussed above. The UI may be associated with an application executing on a user's device, or within a browser, or any other type of known or to be known mechanism for rendering a video. It should be understood that the content of the video can be associated with any type of content, and the functionality of the instant application will remain applicable.

In Step 704, the video is being rendered where a specific sequence of frames are currently being processed by the player. In some embodiments, this can involve identifying specific frames that are being processed by the player (or received by the device upon which the player is executing—for example HLS files). In some embodiments, these frames can be analyzed (prior to or after decoding) and transformed into an array of RGB images (via any type of command line application for converting video/audio codecs—for example, Fast Forward MPEG (FFMPEG) software). Step 704 can then involves parsing and analyzing the received frames and identifying a frame set from within the video.

As a result of the identification of the frame set currently being rendered, Process 700 then performs Step 706 where the trained visual recognizer engine 300 is applied to the identified frame set. As discussed above, the visual recognizer engine 300 performs an object detection modelling technique that compares the training set (the current version of the annotated examples 414 from the training discussed above in relation to FIGS. 4-6B) to the identified frame set, and detects where within the frame set a specific object is—i.e., which frames and where within such frames is the object. Step 708. In some embodiments, if a frame(s) does not have such object, the frame is discarded and the next frame in the sequence is queued up for processing by the engine 300.

For example, using the cats v. dogs example above, a video is being played that involves a cat and a dog playing with each other. While the video is being played, the engine 300 analyzes frames and determines which frames and where within each frame a dog and cat are depicted. For example, as discussed above, a result of Step 708 can provide the following information: {(video id, frame id, x-coordinate, y-coordinate, width, height, category_label)}, which indicates which video a frame depicting a cat/dog is in, where within that frame and in which positional coordinates it can be located. According to some embodiments, the information can further include data that indicates what type of object (e.g., breed of cat/dog) is depicted therein, and any other form of identifying information of the object.

Therefore, Process 700 is performed for a rendered video, and is capable of determining whether and where a cat and/or a dog are displayed on a screen in real-time (e.g., as a video is played). Thus, when a desired object is depicted within a UI, the presence of the object can be automatically detected, processed and identified (as per the above steps of Process 700), and as discussed below in relation to FIG. 8, augmenting or additional information (e.g., information related to the object) can also be automatically displayed within the UI.

FIG. 8 is a work flow example 800 for serving related digital media content based on the information associated with video, as discussed above in relation to FIGS. 3-7. In some embodiments, the content can be associated with or comprising advertisements (e.g., digital advertisement content). In some embodiments, such content can provide augmenting information to the video. Such information, referred to as "object information" for reference purposes only, can include, but is not limited to, information associated with a object detected in the video, the context of the video, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred to as an advertisement, it is still a digital media item that is renderable by a computing device, and such digital media item comprises digital content relaying promotional content provided by a network associated third party.

In Step 802, object information is identified (e.g., from Step 706). As discussed above, the object information can be based any of the information from processes outlined above with respect to FIG. 7. For purposes of this disclosure, Process 800 will refer to single video file as the basis for serving additional content; however, it should not be construed as limiting, as any number of files, as well as programs used and/or content items included therein can form such basis, without departing from the scope of the instant disclosure.

In Step 804, a context is determined based on the identified object information. This context forms a basis for serving content related to the object information. In some embodiments, the context can be in accordance with the context of the video, as discussed above in relation to FIGS. 4-7. For example, a video can include content depicting a cat and dog playing together; therefore, the context identified in Step 804 can be related to "pets" or, more specifically, an animal shelter in the user's area, and can be leveraged in order to identify digital content related to such activities (e.g., offers for cat/dog food, or information providing wiki-information related to the type of breeds depicted in the video, and the like), as discussed herein in relation to the steps of Process 800. In some embodiments, the identification of the context from Step 804 can occur before, during and/or after the analysis detailed above with respect to Process 700, or it can be a separate process altogether, or some combination thereof.

In Step 806, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the visual recognizer engine 300) a search for a relevant digital content within the associated database. The search for the content is based at least on the identified context.

In Step 808, the server searches the database for a digital content item(s) that matches the identified context. In Step 810, an content item is selected (or retrieved) based on the results of Step 808. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with the media. Step 812. In some embodiments, the selected content item is sent directly to a user computing device for display on the device and/or within the UI depicting the video. In some embodiments, the selected content item is displayed within a portion of the interface or within an overlaying or pop-up interface associated with the rendering interface used to play the video.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
receiving, at a computing device, a search query comprising a search term;
searching, via the computing device, a collection of images, and based on said searching, identifying a set of images, said set of images comprising content depicting said search term;
searching, via the computing device, a collection of videos, and based on said searching, identifying a set of videos, each video in said set of videos comprising at least one video frame comprising content depicting said search term;
executing, via the computing device, object detection software on said image set and said video set, said execution comprising analyzing the image set and identifying information related to said content that depicts said search term within each image in the image set, and based on said analysis, performing visual object detection on frames of the videos in the video set based on the identified information from said image set;

generating, via the computing device, a set of annotated video frames based on said visual object detection, said generation comprising annotating video frames of the videos in the video set that comprise said content depicting said search term with information indicating that a depiction of said search term is depicted therein; and training, via the computing device, visual recognizer software with said generated set of annotated video frames.

2. The method of claim 1, further comprising:

searching said collection of videos, and based on said searching, identifying a second video set of videos, each video in said second video set comprising at least one video frame comprising content depicting said search term;

executing said object detection software on said second video set and said set of annotated video frames, said execution comprising performing visual object detection on frames of the videos in the second video set based on the annotated information in said annotated video frame set;

generating a second set of annotated video frames based on said visual object detection, said generation comprising annotating a set of video frames of the videos in the second video set that comprise said content depicting said search term with information indicating that a depiction of said search term is depicted therein; and adding said second set of annotated video frames to a training dataset comprising the annotated video frames.

3. The method of claim 2, further comprising training the visual recognizer software based on said addition of the second set of annotated video frames to the training dataset.

4. The method of claim 1, further comprising:

causing a video file to be rendered over a network on a device of a user;

analyzing the video file as it is rendered on the user device, said analysis comprising identifying a frame set of the video that is currently being rendered;

applying the trained visual recognizer software to said identified frame set; and identifying, based on said application of the trained visual recognizer software, an object depicted within said frame set that corresponds to said search term.

5. The method of claim 4, further comprising:

searching, over a network, for content associated with said object;

identifying, based on said search, said content; and communicating said content for display when said object is displayed within said video said content display comprising information augmenting a depiction of the object within said video.

6. The method of claim 1, further comprising:

sampling each of the videos identified in said video set, and based on said sampling, identifying a frame set for each of the videos in said video set.

7. The method of claim 6, wherein said sampling comprises applying neural network region proposal software on said videos in said video set.

8. The method of claim 1, further comprising:

determining a confidence value for each annotated video frame, said confidence value indicating a quality of the object in each video frame.

9. The method of claim 8, wherein said annotated video frame is automatically added to a training dataset when said confidence value for said frame satisfies a threshold.

10. The method of claim 8, wherein said annotated video frame is verified by an editor when said confidence value does not satisfy a threshold, wherein said annotated video frame is added to a training dataset after said verification.

11. The method of claim 1, further comprising:

downloading and storing said image set upon identifying said image set from said image search; and downloading and storing said video set upon identifying said video set from said video search.

12. A non-transitory computer-readable storage medium tangibly encoded with computer-executable instructions, that when executed by a processor associated with a computing device, performs a method comprising:

receiving, at the computing device, a search query comprising a search term;

searching, via the computing device, a collection of images, and based on said searching, identifying a set of images, said set of images comprising content depicting said search term;

searching, via the computing device, a collection of videos, and based on said searching, identifying a set of videos, each video in said set of videos comprising at least one video frame comprising content depicting said search term;

executing, via the computing device, object detection software on said image set and said video set, said execution comprising analyzing the image set and identifying information related to said content that depicts said search term within each image in the image set, and based on said analysis, performing visual object detection on frames of the videos in the video set based on the identified information from said image set;

generating, via the computing device, a set of annotated video frames based on said visual object detection, said generation comprising annotating video frames of the videos in the video set that comprise said content depicting said search term with information indicating that a depiction of said search term is depicted therein; and training, via the computing device, visual recognizer software with said generated set of annotated video frames.

13. The non-transitory computer-readable storage medium of claim 12, further comprising:

searching said collection of videos, and based on said searching, identifying a second video set of videos, each video in said second video set comprising at least one video frame comprising content depicting said search term;

executing said object detection software on said second video set and said set of annotated video frames, said execution comprising performing visual object detection on frames of the videos in the second video set based on the annotated information in said annotated video frame set;

generating a second set of annotated video frames based on said visual object detection, said generation comprising annotating a set of video frames of the videos in the second video set that comprise said content depicting said search term with information indicating that a depiction of said search term is depicted therein; and adding said second set of annotated video frames to a training dataset comprising the annotated video frames.

14. The non-transitory computer-readable storage medium of claim 13, further comprising training the visual recognizer software based on said addition of the second set of annotated video frames to the training dataset.

15. The non-transitory computer-readable storage medium of claim 12, further comprising:
causing a video file to be rendered over a network on a device of a user;
analyzing the video file as it is rendered on the user device, said analysis comprising identifying a frame set of the video that is currently being rendered;
applying the trained visual recognizer software to said identified frame set; and
identifying, based on said application of the trained visual recognizer software, an object depicted within said frame set that corresponds to said search term.

16. The non-transitory computer-readable storage medium of claim 15, further comprising:
searching, over a network, for content associated with said object;
identifying, based on said search, said content; and
communicating said content for display when said object is displayed within said video said content display comprising information augmenting a depiction of the object within said video.

17. The non-transitory computer-readable storage medium of claim 12, further comprising:
sampling each of the videos identified in said video set, and based on said sampling, identifying a frame set for each of the videos in said video set, wherein said sampling comprises applying neural network region proposal software on said videos in said video set.

18. The non-transitory computer-readable storage medium of claim 12, further comprising:
determining a confidence value for each annotated video frame, said confidence value indicating a quality of the object in each video frame,
wherein said annotated video frame is automatically added to a training dataset when said confidence value for said frame satisfies a threshold, and
wherein said annotated video frame is verified by an editor when said confidence value does not satisfy a threshold, wherein said annotated video frame is added to a training dataset after said verification.

19. A computing device comprising:
a processor;
a non-transitory computer-readable storage medium for tangibly storing thereon program logic for execution by the processor, the program logic comprising:
logic executed by the processor for receiving, at the computing device, a search query comprising a search term;
logic executed by the processor for searching, via the computing device, a collection of images, and based on said searching, identifying a set of images, said set of images comprising content depicting said search term;
logic executed by the processor for searching, via the computing device, a collection of videos, and based on said searching, identifying a set of videos, each video in said set of videos comprising at least one video frame comprising content depicting said search term;
logic executed by the processor for executing, via the computing device, object detection software on said image set and said video set, said execution comprising analyzing the image set and identifying information related to said content that depicts said search term within each image in the image set, and based on said analysis, performing visual object detection on frames of the videos in the video set based on the identified information from said image set;
logic executed by the processor for generating, via the computing device, a set of annotated video frames based on said visual object detection, said generation comprising annotating video frames of the videos in the video set that comprise said content depicting said search term with information indicating that a depiction of said search term is depicted therein; and
logic executed by the processor for training, via the computing device, visual recognizer software with said generated set of annotated video frames.

20. The computing device of claim 19, further comprising:
logic executed by the processor for causing a video file to be rendered over a network on a device of a user;
logic executed by the processor for analyzing the video file as it is rendered on the user device, said analysis comprising identifying a frame set of the video that is currently being rendered;
logic executed by the processor for applying the trained visual recognizer software to said identified frame set; and
logic executed by the processor for identifying, based on said application of the trained visual recognizer software, an object depicted within said frame set that corresponds to said search term.

* * * * *